United States Patent [19]

Jamison

[11] Patent Number: 4,567,332
[45] Date of Patent: Jan. 28, 1986

[54] FOUR-WIRE TELEPHONE SYSTEM WITH SELF-TEST MEANS

[76] Inventor: William E. Jamison, 1459 Reale, St. Louis, Mo. 63138

[21] Appl. No.: 606,897

[22] Filed: May 3, 1984

[51] Int. Cl.[4] ............................................. H04M 1/24
[52] U.S. Cl. .............................. 179/175; 179/175.1 R; 179/175.3 F
[58] Field of Search ......... 179/175.2 R, 175, 175.1 R, 179/175.2 C, 175.3 F, 100 R, 103

[56] References Cited

U.S. PATENT DOCUMENTS 3,185,781  5/1965  Lueft et al. .......................... 179/175
4,323,738  4/1982  Merrick ......................... 179/175.1 R Primary Examiner—Stafford D. Schreyer
Attorney, Agent, or Firm—Kalish & Gilster

[57] ABSTRACT

A four-wire "hoot-and-holler" telephone system provides full duplex conference communication. Four-wire desksets are provided for individual users, being connected by a four-wire telephone circuit. Repeaters at each end of the four-wire circuit provide incoming and outgoing amplification or attenuation for the desksets. Each such deskset includes a console with a speaker and a volume control for the speaker. Four-wire desksets are included in the system for connection to the telephone circuit in lieu of the repeater and the desksets. Each testset includes a self-test circuit and a switch feature for switching between normal and self-test operations. The testset includes also circuitry for allowing it to be used as a substitute for the desksets and the repeater as a stand-alone telephone set. Talk battery is provided by a local power supply of the test set. The testset provides user assurance of proper system operation at any location where utilized, and allows ready verification of the existence of a system fault, as within the four-wire circuit, or within the repeater and four-wire desksets.

13 Claims, 8 Drawing Figures

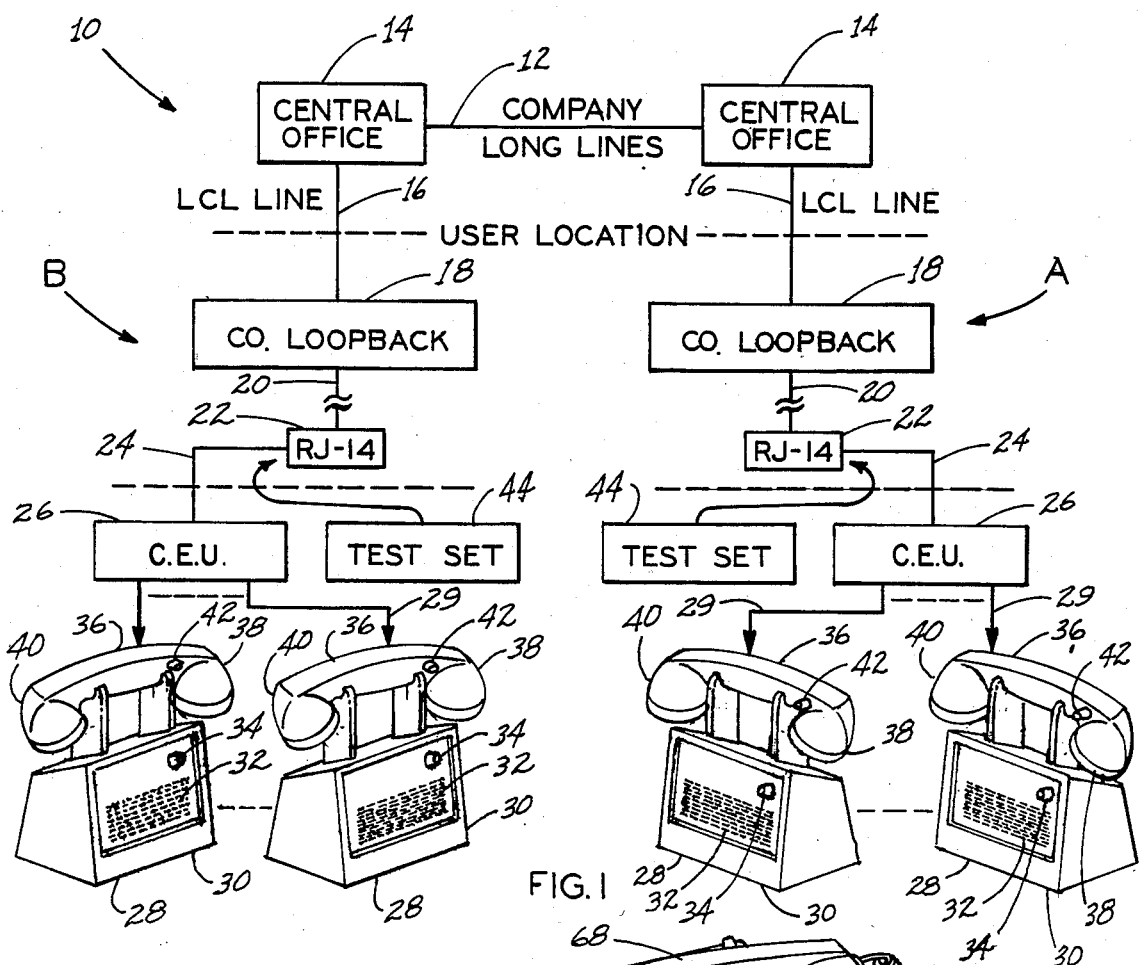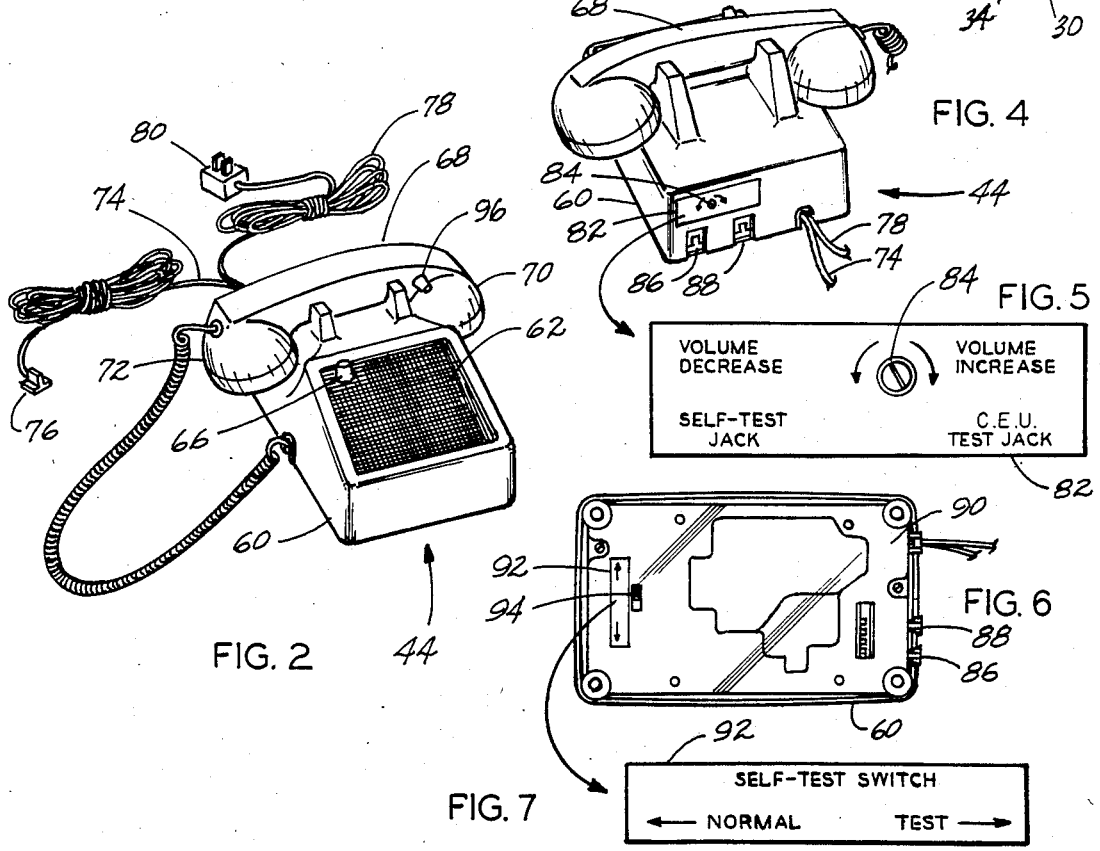

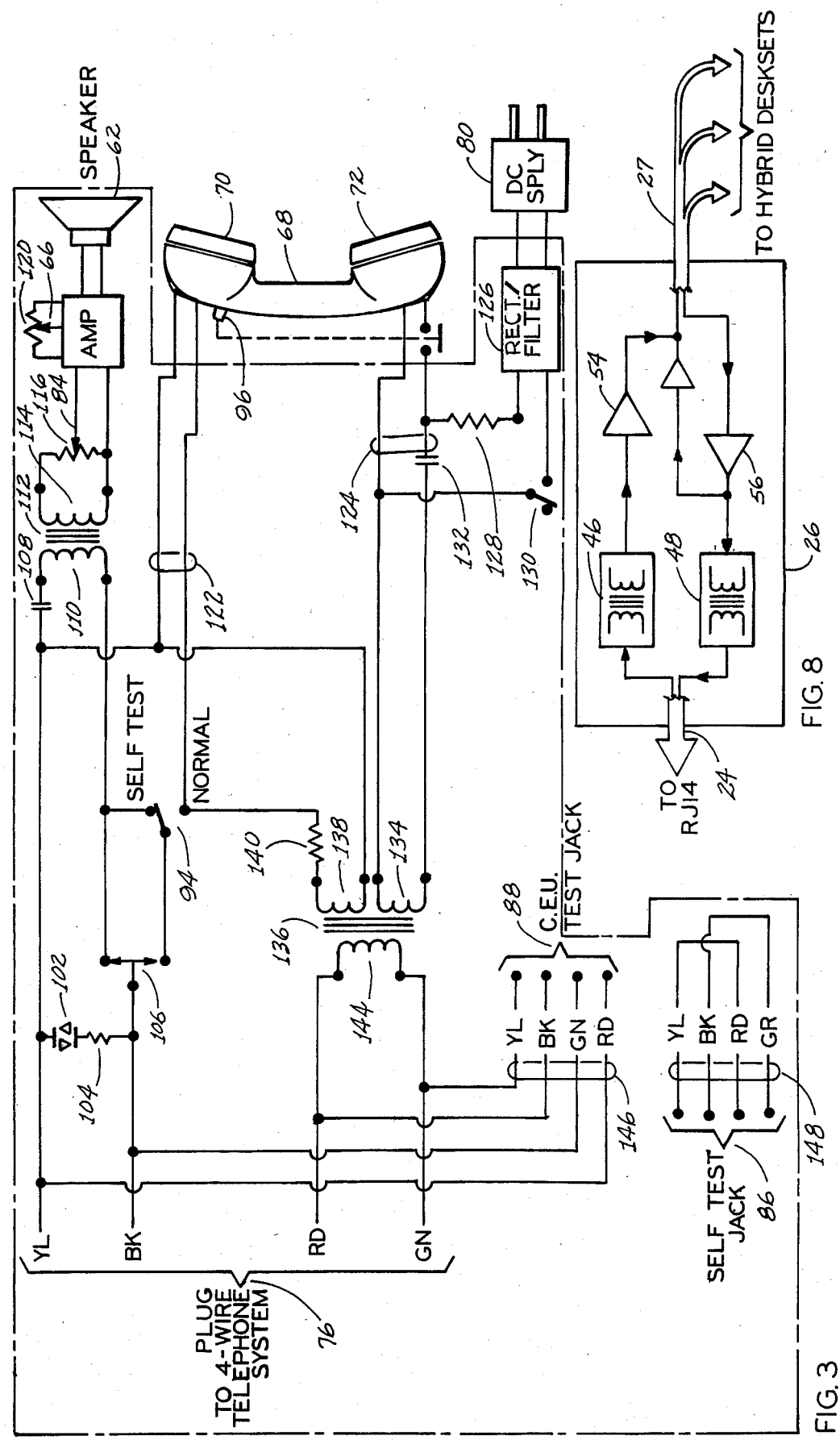

FOUR-WIRE TELEPHONE SYSTEM WITH SELF-TEST MEANS

BACKGROUND AND SUMMARY OF THE INVENTION

This invention relates to telephony and, more particularly, to a four-wire telephone system for private line communications among plural users, specifically known as a "hoot-and-holler" system providing full duplex conference-type communication.

In certain business segments, there is a need for conference-type communication networks wherein all users of the system, whether at a central or various possible remote locations, will simultaneously be provided with instant access to all communications taking place on the system, being both able to receive as well as to transmit messages of interest to users of the system. This is particularly true of stock and commodities brokerages which typically have a central facility as well as numerous branch locations, some of which may be located in states far distant from the central office or facilities. Such a conference-type system is utilized not only for delivering messages from the central facilities of interest relative to the marketing of stocks and other securities, but also permits users at the different remote locations to interrogate and discuss brokerage matters with one or more departments at the central offices or with facilities at a different remote location. Heretofore, such systems have made utilization of existing four-wire telephone circuits, such as have included not only local telephone lines operated by local telephone companies but also long distance or "long lines" telephone circuits.

Until the recent development of private long distance carriers and the divestiture by the major long distance carrier of its local telephone companies, it was typical for a single telephone company to be responsible for all telephone facilities, including not only local telephone facilities and telephone lines on the customer's premises, but also long distance lines. A major consequence of these developments has been that individual telephone customers have become primarily responsible for all telephone equipment and lines which are on their premises. Thus, it now is typical for local telephone companies to require that the user maintain at his own expense such local equipment and the various on-premises telephone wiring such as line cords which link telephone instruments to telephone company points of connection. For such on-premises wiring, the customer is responsible.

If the user of an instrument in such a system experiences difficulty with the system, ordinarily such user will not be able to determine whether the fault lies within the existing telephone lines, such as the long distance circuit, or other line facilities provided by telephone companies or is instead the fault of the equipment or service connections which are the user's responsibility. If the latter, a service call by the telephone company to determine that the fault is a matter of user responsibility will result in a relatively high service call charge. If, on the other hand, the user had the capability in advance to determine that the fault lies within the equipment and service connections which are the responsibility of the telephone company, such user would be able to avoid the imposition of such expensive service expenditures. In a so-called "hoot-and-holler" system involving numerous instruments at various localities, needless service call charges can amount to a very substantial expenditure.

It is an object of the present invention to provide a four-wire "hoot-and-holler" telephone system of improved facility and simplicity, providing numerous functional and commercial advantages and ease of use.

It is a further object of the present invention to provide such a telephone system which allows the user at any of various locations to provide a self-test mode of usage which will readily and promptly allow even a technically unskilled person to ascertain whether the fault is in equipment and service connections which are the responsibility of the user, or instead is within the facilities or equipment maintained and required to be serviced by a telephone company.

Another object of the present invention is the provision of such a telephone system which employs a novel test set which can be utilized for carrying out self-testing operation by such an unskilled, untutored user in a facile, quickly implemented manner.

It is a further object of the invention to provide such a testset which is capable of extrinsic use as a stand-alone telephone instrument for conventional use, standby or temporary use in a location serviced by the system, as where an existing repeater of the system or other related equipment must be taken out of service as for repairs, or is not yet installed.

Another object of the invention is the provision of such a system having relatively few components which are simply and easily installed at a desired location and which includes components which are not of a critical nature and thus will reliably operate immediately upon installation.

Among still other objects of the invention may be noted the provision of such a system having telephone instruments which are reliable and long lasting in usage as well as offering convenience and flexibility of usage, together with ease of adjustment for all operating conditions.

Briefly, a four-wire "hoot-and-holler" telephone system according to the present invention provides full duplex conference communication among all users of this system including one or more users at different locations interconnected by an existing four-wire telephone circuit such as conventional long distance lines to provide thereby a private line system capable of providing high quality conference call intercommunication among all users of the system. The system provides four-wire desksets for individual users. Each Individual deskset includes a deskset console including a speaker for audibly transmitting to the surrounding area all incoming communications and transmissions not originated by the user of the deskset. The deskset includes also a handset including a transmitter for permitting selective origination of outgoing transmissions by the user as well as a conventional handset receiver. desksets as well as any so-called system orators (which provide only a monitoring function) are interconnected with repeaters at the individual locations. The repeaters provide transformer isolation of the desksets with respect to the telephone lines as well as incoming and outgoing amplification.

Included in this system at the different locations are four-wire testsets adapted for connection to the existing telephone circuits in lieu of the repeater and the four-wire desksets.

Each such testset includes a testset console including a speaker like those of the desksets, and similarly includes also a handset with a handset receiver and handset transmitter. Self-test features of the testset permit its user to cause reproduction by the speaker of the testset console of outgoing transmissions as well as substitution by the testset of the repeater and the deskset functions. Accordingly, the testset provides user assurance of proper operation of system components, circuits and line cords and the like at the remote location, and whereby the existence and location of a fault in the system may be readily ascertained, and thereby revealing to the user whether the fault is one which the user is responsible for correcting or whether instead is a fault which is the responsibility of the telephone company, for example, which owns and maintains the existing telephone circuit.

Other objects and features will be in part apparent and in part pointed out hereinbelow.

BRIEF DESCRIPTION OF THE DRAWINGS

FIG. 1 is a block-diagramatic, partly perspective view of a telephone system in accordance with and embodying the present invention.

FIG. 2 is a perspective view of a four-wire testset of the invention utilized in the system of FIG. 1.

FIG. 3 is a schematic circuit diagram of the circuitry of the testset of FIG. 2.

FIG. 4 is a perspective view of the rear of the four-wire testset of FIG. 2, illustrating features thereof for self-test operation.

FIG. 5 is a plan view of a label showing certain indicia and control features on the rear of the telephone testset of FIG. 2.

FIG. 6 is a bottom elevation view of the testset of FIG. 2.

FIG. 7 is a view of a label depicting certain indicia on the bottom of the testset of FIG. 2.

FIG. 8 is a block diagram of circuitry of repeater components of the system of FIG. 1.

Corresponding reference characters indicate corresponding parts throughout the several views of the drawings.

DESCRIPTION OF THE PREFERRED EMBODIMENT

Referring by reference numerals to the drawings, there is illustrated generally at 10 a four-wire telephone system configured according to the invention for providing private line communication among plural users, i.e., persons or facilities which commonly but privately use the system at different locations. Such locations may include, for example, a central location A and a remote location B. Such locations could instead be any two remote locations. But, such different locations are shown interconnected by an existing four-wire telephone circuit such as telephone company "long lines" or long distance lines 12. Such lines may extend between locations in a different city or geographically remote cities. The different locations are shown as each being associated with a central office 14 from each of which extends a local four-wire telephone line circuit 16. Such an arrangement is representative of a leased line connection utilized for conference call purposes, wherein the same telephone circuit is continually made available between the remotely located facilities.

System 10 is a so-called "hoot-and-holler" type intended for providing full duplex conference communication among all users of the system. Although only two such locations A and B are shown, it will be understood that many different users of the same system, in actuality, exist and with numerous locations and/or cities being interconnected by such telephone circuit 12 or comparable circuits interconnecting to the central offices, as well as extensions of the local line 16 to different facilities of the user at a respective location.

Shown associated with each of the locations A and B is a telephone company loopback device 18 by which local testing by the phone company is accomplished. Extending from such loopback device 18 is a local circuit 20 which provides extension of the four-wire circuit to a terminal connection 22 such as of the RJ-14 jack designation provided conventionally by telephone companies for user connection, as here shown by a line cord or local telephone circuit 24.

A private line system of the invention includes also at each such location at least one repeater 26, i.e., as may be generically or more aptly termed a common equipment unit ("C.E.U."), for providing interfacing between the four-wire telephone circuit thus provided and a number of four-wire desksets, as at 28, as by use of a line cord 29. Each C.E.U. 26 is of the general configuration hereinbelow described with respect to FIG. 8. But for present purposes, it will be understood that a substantial number of said desksets 28 may be connected to each C.E.U. repeater 26, e.g., up to 36 per C.E.U.

Each such four-wire deskset is intended to provide for an individual user full duplex communication with all of the users of the system, and having for such purposes a deskset console as at 30 including a speaker 32 for audibly transmitting to the surrounding area all incoming communication transmissions not originated by the user of the respective deskset. The speaker volume may be changed to meet user requirements by use of a volume control 34. Each of the desksets includes also a handset, as at 36, including a receiver 38 for permitting private reproduction of the incoming transmissions and a transmitter 40 at the other end of the handset for permitting origination of outgoing transmissions by the deskset user. A push-to-talk (PTT) bar or button 42 is provided on each handset 36 so that, when the handset is lifted and such PTT button is depressed, the user may originate transmissions and, when so depressed, permitting the received signal to be switched to the receiver 38 rather than from speaker 32.

As will be understood, full duplex communications using such a system implies that all users having one of the desksets 28 will hear transmissions originated by any user of the system. In a typical mode of usage, only a single user might make an announcement, for example, from a central location which would be of current significance to users at other desksets of the system, as in the daily commerce associated with brokerage of stocks and commodities. There is, accordingly, seen to be a conference type of system wherein all users may hear all communications taking place on the system and wherein each user equipped with such a four-wire deskset 28 may also originate the transmissions. Although not shown, said four-wire desksets 28 may be replaced or substituted for by so called orators each containing only a console having a speaker like that designated at 32 as well as a volume control like that shown at 34, but otherwise not provided with a handset 36. Such orators would then permit only a receiving or monitoring function of transmissions but would not provide origination of same.

In accordance with the invention, at each of the respective locations A and B, the system is provided with a four-wire testset 44 which may take the form illustrated in FIG. 2 and including features as hereinbelow described. Each such testset may be plugged into the RJ-14 terminal, as at 22 at the respective location instead of the repeater 26 and the desksets 28 connected to the respective C.E.U. for the testing of the integrity of communications at the respective remote locations and for providing user assurance of proper system operations of system components, circuits and line cords and the like at each such location so equipped with a testset.

Alternatively, such testset 44 may be used as a substitute instrument in lieu of a repeater 26 and its connected such desksets 28 where there is a need only for a single facility for receiving and originating transmissions at the respective location such as for temporary purposes, or pending the installation of more comprehensive equipment, or in the case of a small, local user facility requiring but a single telephone instrument.

Referring to FIG. 8, each C.E.U. 26 is seen to include isolation transformers as at 46, 48 for providing isolation for the incoming and outgoing line pairs, respectively. In this regard, it will be understood that circuit 24 includes two pairs 50, 52 of conductors which provide the respective incoming and outgoing transmissions. The isolation transformer 46 for incoming line pair 50 is interconnected with an amplifier 54 which provides amplification or attenuation of signals to a level suitable for delivery to each such four-wire deskset units, as by line 27. Similarly, an amplifier 56 is interconnected with isolation transformer 48 for causing outgoing transmissions to be amplified to an appropriate level for transmission of telephone circuit 12. As is conventional, a sidetone amplifier 58 is utilized for providing to each of the desksets a relatively low level sidetone signal permitting the user to hear through receiver 38 of the handset 36, the transmissions originated by such user.

Referring to FIG. 2, each of the testsets 44 includes a testset console 60 including a speaker 62 for audibly transmitting to the surrounding area all incoming transmissions not originated by the user of the testset. Like the several desksets, testset 44 also includes a user selectable volume control 66 permitting user control of the transmitting level of speaker 62. A handset 68 of the new testset includes a receiver 70 at one end for permitting reproduction of the incoming transmissions and transmitter means 72 at the other for permitting origination of transmission by the user.

A line cord 74 extends from the rear of console 60 and includes a modular four-wire plug 76 at its outer end for connection to the RJ-14 terminal at the location where testset 44 is provided. Also extending from the rear of console 60 is a power cord 78 having at its outer end a wall plug transformer 80 for providing a stepped down AC voltage for operation of testset 44 when transformer 80 is plugged into the AC power mains.

Testset 44 includes self-test circuitry for permitting the user of the testset to cause reproduction by speaker 62 of outgoing transmissions, delivered by the user into a receiver 72, for assuring of proper operation of the testset and includes other self-test circuitry and other novel circuit features which are described hereinbelow with respect to FIG. 3.

However, before considering FIG. 3, there should be noted the provision at the rear of console 60 a label 82 at the center of which is provided a volume control 84, preferably being only screwdriver or otherwise tool-adjustable, for establishing internally the volume level to be reproduced by speaker 62 and for permitting control 66 to be utilized in such a fashion that, when control 66 is reduced to its lowest level, there will nevertheless be a minimum audible signal reproduced by speaker 62. Located below label 82 are a self-test jack 86 and a repeater test jack 88 of the four-wire modular type for use as described hereinbelow.

Considering also FIGS. 6 and 7 the bottom 90 of console 60 is provided also with a label 92 located in proximity to a self-test switch 94 for marking normal and test positions of said switch, utilized in the manner to be described shortly.

Referring now to FIG. 3, the circuitry of test telephone 44 is illustrated. Plug 76 provides a connection for an incoming line pair consisting of leads YL and BK across which is connected a voltage suppressor or so-called varistor 102, in series with a resistor 104, for voltage peak limiting. Line BK is connected to the center terminal of a hook switch 106 which is shown in its on-hook position, being movable to the opposite position upon lifting of hand piece 68 from its cradle on console 60. Line YL is connected through a capacitor, which serves to suppress noise and transient voltage spikes, to the primary winding 110 of an isolation transformer 112. Its secondary winding 114 has connected across it a potentiometer 116 which includes a wiper positioned by and thus designated as volume control 84.

Accordingly, the incoming signals provided to leads YL and BK of plug 76, which is connected to the telephone system by being inserted or plugged into an RJ-14 terminal of the system, are provided across potentiometer 116 at the level established by control 84 (assuming hand piece 68 is on-hook to provide positioning of switch 106 as shown) to an amplifier 118. The output of amplifier 118 is supplied to speaker 62. Connected conventionally with amplifier 118 is volume control consisting of a potentiometer 120, the wiper which is positionable and designated as volume control 66. If handpiece 68 is lifted from its cradle, thereby positioning switch 106 in its off-hook position, it will be seen that the incoming signal is provided instead through self-test switch 94 to a pair of leads 122 to the receiver handpiece 70.

Although internal to the handpiece 68, switch contacts 96 operated by the PTT button are shown in a pair of leads 124 from which outgoing signals are provided by the handpiece transmitter 72. So-called battery for talk power is provided by AC supply 80, being supplied by a rectifier - filter 126 and resistor 128 when permitted by switch contacts 130, which close when the handpiece 68 is taken off-hook. An isolation capacitor 132 decouples the DC voltage from the outgoing circuit, which is interconnected with a primary winding 134 of a transformer 136. A secondary winding 138 of the latter provides side tone signals through a resistor 140 to the lead pair 122 for side tone to the user in handpiece receiver 70.

An output winding 144 of transformer 136 provides outgoing signals across leads RD and GN which are connected with plug 76. Also shown connected across the incoming and outgoing lead pair are four leads 146 which are connected to repeater test jack 88. Self-test jack 86 has four leads 148 interconnected as shown so that lead YL is routed to lead RD and lead BK is routed to lead GR for purposes presently appearing.

In operation, conventional use of the system requires only that any user provided with a deskset 28 lift its handpiece 36 from the cradle and depress the PTT button 42 while speaking into the handpiece transmitter 40. The repeater 26 to which such deskset is connected will provide amplification, permitting a signal of adequate level to be delivered to all other desksets interconnected with such repeater as well as providing signals of adequate level on telephone circuit 12 and whereby users at all other desksets at remote locations interconnected with the originating location by such long distance line 12 will be provided, by deskset speaker reproduction, with the communications so originating.

If during such normal usage, difficulty should be determined to exist as, for example, if a communication is not of adequate level or the telephone circuit appears to be inoperative, the user of a deskset at any location provided with intercommunication with the system may use testset 44 for determining whether the problem is one which is the responsibility of the telephone company or one which is an equipment problem which the user must correct, or may be one caused by a local circuit which also is one of user responsibility, such as in a particular line cord or the like.

The first step in the use of testset 44 is to provide self-testing of the testset for verification that is in proper working order. To carry out a self-test of testset 44, the user plugs transformer 80 into a mains receptacle. Switch 94 is placed in the "self-test" position, line cord 74 is plugged into self-test jack 86 and volume control 66 is turned up from its minumum position to at least a lower setting. Should any feedback be heard, the volume control 66 may be reduced to eliminate same. The user depresses PTT button 96 and speaks into the handpiece transmitter 72. The user's voice will then be heard from speaker 62, thereby verifying operation of the transmitting circuitry of the test set, its line cord 74 and its receiver circuitry as well.

Then, to test the four-wire circuit 20 coming into the facility where the user is located, line cord 74 of the testset is removed from the self test jack and plugged into the RJ-14 receptacle 22 located at such premises. Also the test switch is returned to the normal position. The user should then be able to transmit and receive communications in the ordinary way as with the deskset utilized in conjunction with the repeater. However, if such communications are not normal, and the telephone circuit appears to be dead, the user of the testset may assume that the particular telephone company circuit is defective. To provide confirmation that such is indeed the difficulty, the user then tests C.E.U. 26 which is connected normally to RJ-14 receptacle 22 and all desksets interconnected with such C.E.U.

To test such C.E.U. and desksets, the line cord 24 by which such repeater 26 is normally interconnected with receptacle 22 is plugged into repeater test jack 88 of the testset. Switch 94 should be positioned in the "normal" position. If the repeater is operating properly, the user of the testset should be able to provide voice communications, by speaking into the testset handpiece transmitter 72, which will be heard by the speaker 32 of all desksets interconnected with such repeater 26. Similarly also, users of such desksets should be able to provide transmissions which will be heard by the user of the testset either by its speaker 62 or handpiece receiver 70. Should C.E.U. 26 be found by such test to be operating improperly, or to have failed, testset 44 may be left plugged into receptacle 22 as a temporary means of communication until repairs can be made to the faulty C.E.U. 26.

Of course, if the test procedures thus utilized demonstrate that a fault lies within the telephone circuit lines, as in long distance line 12, or a local line 16 by which there is connected to a company interface, or the local line 20 connecting the same to a receptacle 22, the telephone company having responsibility for such equipment may then be notified with the assurance that the user and his company will not be imposed with a service charge since he is assured that the problem does not exist in the equipment or the circuits which are user responsibility.

Although the foregoing includes a description of the best mode contemplated for carrying out the invention, various modifications are contemplated.

As various modifications could be made in the construction herein described and illustrated without departing from the scope of the invention, it is intended that all matter contained in the foregoing description or shown in the accompanying drawings shall be interpreted as illustrative rather than limiting.

What is claimed is:

1. For use with a four-wire full duplex telephone system having at least two different location interconnected by an existing four-wire telephone circuit, a four-wire full duplex testset for at least one location for connection to said circuit to provide normal full duplex communication and also to provide testing of integrity of communications at such location, the improvement comprising a line cord including a line core plug for connection of said testset with said existing telephone circuit, self-test circuitry permitting the user of the testset to cause a test mode of operation providing user assurance of proper operation of said testset when testing the integrity of communications with said existing telephone circuit whereby existence of fault within said existing circuit may be readily ascertained with user certainty that fault does not exist within said tester and line cord.

2. For use with a four-wire full duplex telephone system as set forth in claim 1, the improvement further characterized by a console including a speaker, a handset cradle, and a bandset including handset receiver means for permitting private reproduction for the user of transmissions received by said testset, and handset transmitter means for permitting user origination of outgoing voice transmissions, said self-test circuitry including a self-test jack for receiving said line core plug, and circuit means for causing reproduction for said speaker of voice transmissions by said handset transmitter means when said plug is received by said self-test jack, thereby to provide assurance of proper operation of said testset and said line cord.

3. For use with a four-wire full duplex telephone system a full duplex testset as set forth in claim 2, further characterized by said self-test circuitry including a self-test switch means, switch position selectible by the user of said testset, for normally routing incoming voice transmissions to said handset receiver means when said handset is off said cradle but selectively providing routing voice transmissions to said speaker during self-testing when said handpiece is off said cradle.

4. For use with a four-wire full duplex telephone system, a full duplex testset as set forth in claim 2, further characterized by said testset including power supply means for operation of said testset including a plug transformer for converting AC power to a stepped down AC voltage, and rectifier and filter means for converting such AC voltage to a DC voltage for talk battery power for said handset transmitter means.

5. For use with a four-wire full duplex telephone system, a full duplex testset as set forth in claim 2, further characterized by said testset including an amplifier for amplifying incoming transmissions for reproduction by said speaker, first volume control means for controlling level of incoming signals supplied to said amplifier for amplification thereof and second volume control means for controlling the amplification by said amplifier, said second volume control means being user adjustable for controlling the volume provided by said speaker, whereby said speaker will reproduce audible signals of at least a minimum level.

6. For use with a four-wire full duplex telephone system as set forth in claim 2, further characterized by said system including a common equipment unit and telephone sets interconnected with said common equipment unit further comprising, said testset including a common equipment unit test jack for permitting connection of said common equipment unit to said testset for permitting verification by normal use of said testset of proper operation of said common equipment unit and telephone sets interconnected with said common equipment unit.

7. A four-wire "hoot-and-holler" telephone system for providing full duplex conference communication among all users of the system including one or more users at different locations interconnected by an existing four-wire long distance telephone circuit, comprising:
a four-wire full duplex deskset for each of said users, each such deskset including
a deskset console including a speaker for audibly transmitting to the surrounding area all incoming voice transmissions not originated by a user of the deskset;
and a handset including receiver means for permitting private reproduction of such incoming transmissions and transmitter means for permitting origination of outgoing voice transmission by a user of the deskset;
common equipment unit means associated with each location and connected between such desksets and said existing long distance telephone circuits for providing incoming and outgoing amplification for said desksets;
at least a four-wire duplex testset for each remote location adapted for connection to said existing long distance telephone circuits in lieu of said common equipment unit means and said desksets for testing of integrity of communications of the respective locations, said testset including:
a testset console including a speaker for audibly transmitting to the surrounding area all incoming communication transmissions not originated by the user of the testset;
a handset including receiver means for permitting reproduction for the user of such incoming transmissions and transmitter means for permitting origination of outgoing transmissions by the user of the testset; and
self-test means for permitting the user of the testset to cause reproduction by the speaker of the testset of outgoing transmissions originated at the transmitter for assuring proper operation of the testset;
whereby said testset provides user assurance of proper operation of said system at a respective location and whereby existence of a fault within said existing circuits may be readily ascertained.

8. A four-wire telephone system according to claim 7, further characterized by said testset comprising a console including a speaker, a handset cradle, and a handset including handset receiver means for permitting private reproduction for the user of trasnmissions received by said testset, and handset transmitter means for permitting user origination of outgoing voice transmissions, said testset having a line cord including a plug for connection with said existing telephone circuit, said self-test means including a self-test jack for receiving said plug, and circuit means for causing reproduction for said speaker of voice transmissions by said handset transmitter means when said plug is received by said self-test jack, thereby to provide assurance of proper operation of said testset and said line cord.

9. A four-wire telephone system according to claim 8 and further characterized by means including a self-test switch means, switch position selectible by the user of said testset, for normally routing incoming voice transmissions to said handset receiver means when said handset is off said cradle but selectively providing routing voice transmissions to said speaker during self-testing when said handpiece is on said cradle.

10. A four-wire telephone system according to claim 8, further characterized by said testset including DC power supply means for operation of said testset including a plug transformer for converting AC power to a stepped down AC voltage and rectifier and filter means for converting such AC voltage to a DC voltage for talk battery power for said handset transmitter means.

11. A four-wire telephone system according to claim 8, further characterized by said testset including an amplifier for amplifying incoming transmissions for reproduction by said speaker, first volume control means for controlling the level of incoming signals supplied to said amplifier for amplification thereof and second volume control means for controlling the amplification by said amplifier, said second volume control means being user adjustable for controlling the amplification by said amplifier, said second volume control means being user adjustable for controlling the volume provided by said speaker, whereby said speaker will reproduce audible signals of at least a minimum level.

12. A four-wire telephone system according to claim 8, further characterized by each common equipment unit means including:
means for transformer isolating of such desksets from said existing circuits;
incoming amplifier means for selectively amplifying or attenuating transmissions incoming from said existing circuits;
outgoing amplifier means for amplifying transmissions outgoing to said existing circuits;
sidetone amplifier means for providing to each of such desksets a sidetone reproduction of such outgoing transmissions; and
first and second isolation transformers associated with incoming and outgoing circuit parts of said telephone circuits for coupling incoming and outgoing transmissions to said incoming and outgoing amplifier, respectively.

13. A four-wire telephone system according to claim 7 and further characterized by volume control means associated with each said deskset console for controlling the volume of transmissions provided by the speaker of such deskset console.

* * * * *

UNITED STATES PATENT AND TRADEMARK OFFICE
CERTIFICATE OF CORRECTION

PATENT NO. : 4,567,332
DATED : January 28, 1986
INVENTOR(S) : William E. Jamison It is certified that error appears in the above-identified patent and that said Letters Patent is hereby corrected as shown below:

Column 2, line 50, delete "Individual";
line 57, begin a new paragraph and insert ---Individual---.

Column 8, line 23, change "location" to ---locations---;
line 29, change "core" to ---cord---;
line 42, change "bandset" to ---handset---;
line 47, change "core" to ---cord---.

Signed and Sealed this

Thirteenth Day of May 1986

[SEAL]

Attest:

DONALD J. QUIGG

Attesting Officer

Commissioner of Patents and Trademarks